(12) United States Patent
Chen et al.

(10) Patent No.: US 11,616,970 B1
(45) Date of Patent: Mar. 28, 2023

(54) MOTION VECTOR REFINEMENT APPARATUS HAVING MOTION VECTOR PREDICTOR DERIVATION CIRCUIT THAT IS ALLOWED TO START NEW TASK WITHOUT WAITING FOR MOTION VECTOR DIFFERENCE COMPUTATION AND ASSOCIATED MOTION VECTOR REFINEMENT METHOD

(71) Applicant: MEDIATEK INC., Hsin-Chu (TW)

(72) Inventors: Chi-Hung Chen, Hsinchu (TW); Cheng-Han Li, Hsinchu (TW); Hong-Cheng Lin, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 17/584,313

(22) Filed: Jan. 25, 2022

(51) Int. Cl.
| | | |
|---|---|---|
| *H04N 19/513* | (2014.01) | |
| *H04N 19/139* | (2014.01) | |
| *H04N 19/176* | (2014.01) | |
| *H04N 19/184* | (2014.01) | |
| *H04N 19/44* | (2014.01) | |
| *H04N 19/433* | (2014.01) | |
| *H04N 19/423* | (2014.01) | |

(52) U.S. Cl.
CPC ......... *H04N 19/513* (2014.11); *H04N 19/139* (2014.11); *H04N 19/176* (2014.11); *H04N 19/184* (2014.11); *H04N 19/423* (2014.11); *H04N 19/433* (2014.11); *H04N 19/44* (2014.11)

(58) Field of Classification Search
CPC .. H04N 19/136; H04N 19/176; H04N 19/184; H04N 19/423; H04N 19/433; H04N 19/44; H04N 19/513
See application file for complete search history.

(56) References Cited

U.S. PATENT DOCUMENTS

| | | | | |
|---|---|---|---|---|
| 10,469,869 | B1* | 11/2019 | Li | ........................ H04N 19/159 |
| 2013/0208805 | A1* | 8/2013 | Sato | ........................ H04N 19/52 |
| | | | | 375/240.16 |

(Continued)

FOREIGN PATENT DOCUMENTS

| | | |
|---|---|---|
| CN | 113728644 A | 11/2021 |
| TW | 201813396 A | 4/2018 |

OTHER PUBLICATIONS

H. Gao, X. Chen, S. Esenlik, J. Chen and E. Steinbach, "Decoder-Side Motion Vector Refinement in VVC: Algorithm and Hardware Implementation Considerations," in IEEE Transactions on Circuits and Systems for Video Technology, vol. 31, No. 8, pp. 3197-3211, Aug. 2021, doi: 10.1109/TCSVT.2020.3037024. (Year: 2021).*

(Continued)

*Primary Examiner* — Jeremiah C Hallenbeck-Huber
(74) *Attorney, Agent, or Firm* — Winston Hsu (57) ABSTRACT

A motion vector refinement apparatus includes a first storage device, a motion vector predictor (MVP) derivation circuit, and a decoder side motion vector refinement (DMVR) circuit. The MVP derivation circuit derives a first MVP for a current block, stores the first MVP into the first storage device, and performs a new task. The DMVR circuit performs a DMVR operation to derive a first motion vector difference (MVD) for the first MVP. The MVP derivation circuit starts performing the new task before the DMVR circuit finishes deriving the first MVD for the first MVP.

18 Claims, 6 Drawing Sheets

(56) References Cited

U.S. PATENT DOCUMENTS

| | | | |
|---|---|---|---|
| 2019/0394483 A1* | 12/2019 | Zhou | H04N 19/43 |
| 2020/0169748 A1* | 5/2020 | Chen | H04N 19/563 |
| 2020/0186827 A1* | 6/2020 | Abe | H04N 19/436 |
| 2020/0221118 A1* | 7/2020 | Xu | H04N 19/169 |
| 2021/0344948 A1* | 11/2021 | Abe | H04N 19/52 |
| 2022/0159277 A1* | 5/2022 | Urban | H04N 19/132 |

OTHER PUBLICATIONS

H. Gao, S. Esenlik, Z. Zhao, E. Steinbach and J. Chen, "Decoder Side Motion Vector Refinement for Versatile Video Coding," 2019 IEEE 21st International Workshop on Multimedia Signal Processing (MMSP), 2019, pp. 1-6, doi: 10.1109/MMSP.2019.8901709. (Year: 2019).*

H. Yang et al., "Subblock-Based Motion Derivation and Inter Prediction Refinement in the Versatile Video Coding Standard," in IEEE Transactions on Circuits and Systems for Video Technology, vol. 31, No. 10, pp. 3862-3877, Oct. 2021, doi: 10.1109/TCSVT. 2021.3100744. (Year: 2021).*

* cited by examiner

| 0 | 1 | 4 | 5 | 8 | 9 | 12 | 13 |
|---|---|---|---|---|---|----|----|
| 2 | 3 | 6 | 7 | 10| 11| 14 | 15 |
| 16| 17| 20| 21| 24| 25| 28 | 29 |
| 18| 19| 22| 23| 26| 27| 30 | 31 |
| 32| 33| 36| 37| 40| 41| 44 | 45 |
| 34| 35| 38| 39| 42| 43| 46 | 47 |
| 48| 49| 52| 53| 56| 57| 60 | 61 |
| 50| 51| 54| 55| 58| 59| 62 | 63 |

MOTION VECTOR REFINEMENT APPARATUS HAVING MOTION VECTOR PREDICTOR DERIVATION CIRCUIT THAT IS ALLOWED TO START NEW TASK WITHOUT WAITING FOR MOTION VECTOR DIFFERENCE COMPUTATION AND ASSOCIATED MOTION VECTOR REFINEMENT METHOD

BACKGROUND

The present invention relates to motion vector refinement, and more particularly, to a motion vector refinement apparatus having a motion vector predictor (MVP) derivation circuit that is allowed to start a new task without waiting for motion vector difference (MVD) computation and an associated motion vector refinement method.

The conventional video coding standards generally adopt a block based coding technique to exploit spatial and temporal redundancy. For example, the basic approach is to divide the whole source picture into a plurality of blocks, perform intra/inter prediction on each block, transform residues of each block, and perform quantization and entropy encoding. Besides, a reconstructed picture is generated in a coding loop to provide reference pixel data used for coding following blocks. For certain video coding standards, in-loop filter(s) may be used for enhancing the image quality of the reconstructed picture.

The video decoder is used to perform an inverse operation of a video encoding operation performed by a video encoder. For example, the video decoder may have a plurality of processing circuits, such as an entropy decoding circuit, an intra prediction circuit, a motion compensation circuit, an inverse quantization circuit, an inverse transform circuit, a reconstruction circuit, and in-loop filter(s). When a merge mode is selected, motion information of a current block in a current picture may be set by motion information of a spatially or temporally neighboring block, and thus may suffer from reduced precision. To refine the merge-mode motion vector (MV) without signaling, a decoder side motion vector refinement (DMVR) algorithm may be employed. Specifically, to refine the merge-mode MV, the DMVR algorithm has to traverse neighbor points to find the minimum sum of absolute difference (SAD), and refer to a position with the minimum SAD to determine a motion vector difference (MVD). For example, the search range is ±2, such that total 25 points are in the search window, and a center point of the search window is pointed to by a motion vector predictor (MVP) derived from motion information of a previously decoded block. The final MV (i.e. refined MV) for the current block in the current picture can be obtained by combining MVP and MVD.

The MVD for refining the MVP determined for the current block in the current picture is not signaled from a video encoder to a video decoder, and is computed at the video decoder through the DMVR algorithm. Specifically, to compute the MVD needed for refining the MVP, reference pixels in a forward reference picture and a backward reference picture are needed to be read from a dynamic random access memory (DRAM), where the forward reference picture (e.g. one picture included in a reference picture list L0) is in the past with respect to the current picture in a display order, the backward reference picture (e.g. one picture included in a reference picture list L1) is in the future with respect to the current picture in the display order, and the distance between the forward reference picture and the current picture is the same as the distance between the current picture and the backward reference picture. As mentioned above, the final MV (i.e. refined MV) for the current block can be obtained when computation of the MVD for the current block is done. In accordance with the conventional video decoder design, computation of the MVP of a next block is not started until the final MV (i.e. refined MV) for the current block is obtained. That is, computation of the MVP for the next block is not started until computation of the MVD for the current block is done. Since computation of the MVD for the current block requires reference pixels read from the DRAM and reading the reference pixels from the DRAM requires several DRAM clock cycles, computation of the MVP of the next block has to wait for an end of the computation of the MVD for the current block due to the DRAM latency, which results in degraded decoder performance.

SUMMARY

One of the objectives of the claimed invention is to provide a motion vector refinement apparatus having a motion vector predictor (MVP) derivation circuit that is allowed to start a new task without waiting for motion vector difference (MVD) computation and an associated motion vector refinement method.

According to a first aspect of the present invention, an exemplary motion vector refinement apparatus is disclosed. The exemplary motion vector refinement apparatus includes a first storage device, a motion vector predictor (MVP) derivation circuit, and a decoder side motion vector refinement (DMVR) circuit. The MVP derivation circuit is arranged to derive a first MVP for a current block, store the first MVP into the first storage device, and performs a new task. The DMVR circuit is arranged to perform a DMVR operation to derive a first motion vector difference (MVD) for the first MVP. The MVP derivation circuit is free to start performing the new task before the DMVR circuit finishes deriving the first MVD for the first MVP.

According to a second aspect of the present invention, an exemplary motion vector refinement method is disclosed. The exemplary motion vector refinement method includes: deriving a first motion vector predictor (MVP) for a current block; storing the first MVP into a first storage device; performing a decoder side motion vector refinement (DMVR) operation to derive a first motion vector difference (MVD) for the first MVP; and before deriving the first MVD for the first MVP is finished, starting to perform a new task.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
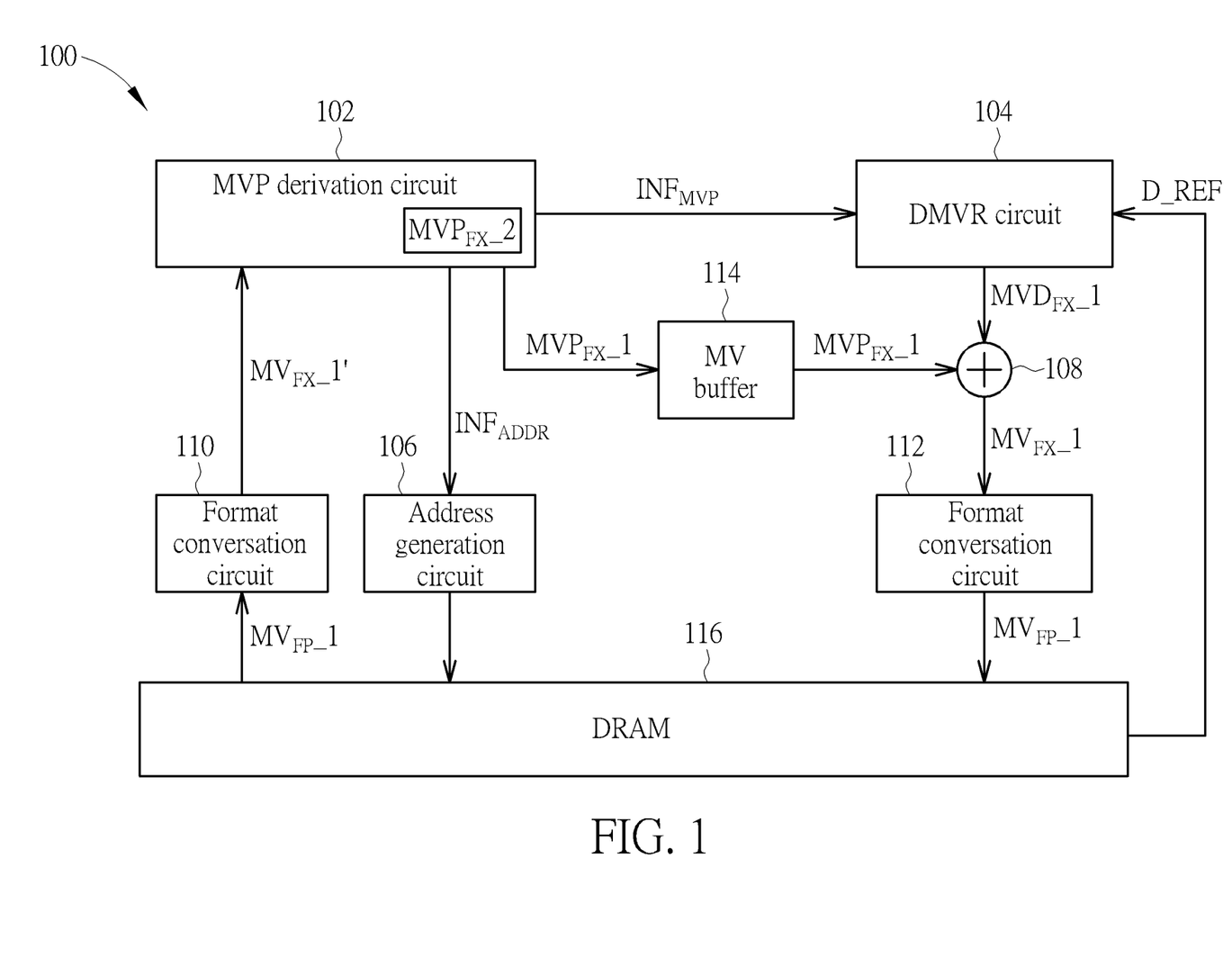
FIG. 1 is a diagram illustrating a first motion vector refinement apparatus according to an embodiment of the present invention.

FIG. 1 is a diagram illustrating a first motion vector refinement apparatus according to an embodiment of the present invention. The motion vector refinement apparatus 100 may be a part of a video decoder, and the video decoder is used to deal with decoding of an input bitstream that may be in compliance with a Versatile Video Coding (VVC) standard (also known as H.266 standard). However, this is for illustrative purposes only, and is not meant to be a limitation of the present invention. In practice, any video decoder using the architecture proposed by the present invention falls within the scope of the present invention. The motion vector refinement apparatus 100 includes a motion vector predictor (MVP) derivation circuit 102, a decoder side motion vector refinement (DMVR) circuit 104, an address generation circuit 106, a combining circuit 108, a plurality of format conversion circuits 110, 112, and a plurality of individual storage devices such as a motion vector (MV) buffer 114 (which may be an on-chip memory) and a dynamic random access memory (DRAM) 116 (which may be an off-chip memory).

The MVP derivation circuit 102 is arranged to derive a motion vector predictor $MVP_{FX\_1}$ for a current block in a current picture, and stores the motion vector predictor $MVP_{FX\_1}$ into the MV buffer 114. In this embodiment, the motion vector predictor $MVP_{FX\_1}$ is in a first representation format such as a fixed-point format. After the motion vector predictor $MVP_{FX\_1}$ is derived from motion vectors of neighbors of the current block under a merge mode, the MVP derivation circuit 102 is further arranged to provide side information $INF_{MVP}$ to the DMVR circuit 104, and provide side information $INF_{ADDR}$ to the address generation circuit 106. In response to the side information $INF_{ADDR}$, the address generation circuit 106 determines read addresses at which reference data D_REF (e.g. reference pixels in the forward reference picture and the backward reference picture) needed by computation of the motion vector difference $MVD_{FX\_1}$ are stored. In other words, the side information $INF_{ADDR}$ is sent to the address generation circuit 106 to request the reference data D_REF that are stored in the DRAM 116.

The DMVR circuit 104 is arranged to perform a DMVR operation to derive a motion vector difference $MVD_{FX\_1}$ for the motion vector predictor $MVP_{FX\_1}$ after receiving the side information $INF_{MVP}$ from the MVP derivation circuit 102. For example, the DMVR circuit 104 reads the reference data D_REF from the DRAM 116, calculates 25 SAD values for 25 positions within a search window centered at a position of the current block, finds a minimum SAD value among the 25 SAD values, and determines the motion vector difference $MVD_{FX\_1}$ according to a position with the minimum SAD value. In this embodiment, the motion vector difference $MVD_{FX\_1}$ is also in the first representation format such as the fixed-point format.

Since the motion vector predictor $MVP_{FX\_1}$ obtained by the MVP derivation circuit 102 is stored into the MV buffer 114, the combining circuit 108 is arranged to obtain the motion vector predictor $MVP_{FX\_1}$ from the MV buffer 114 rather than the MVP derivation circuit 102. With the help of the MV buffer 114 that offers MVP buffering between the MVP derivation circuit 102 and the combining circuit 108, the MVP derivation circuit 102 is allowed to start a new task before the DMVR circuit 104 finishes deriving the motion vector difference $MVD_{FX\_1}$ for the motion vector predictor $MVP_{FX\_1}$ of the current block. In some embodiments, the new task includes at least one of deriving a motion vector predictor $MVP_{FX\_2}$ for a next block, reading a data from a storage device (e.g., DRAM 116 or SRAM which is not shown herein) for a later computation, writing a data to the storage device for a later computation, or any other tasks independent from deriving the motion vector difference in order to use free computation resource efficiently. In the embodiment that the new task performs deriving the motion vector predictor $MVP_{FX\_2}$ for the next block, after determining the motion vector predictor $MVP_{FX\_2}$ for the next block, the MVP derivation circuit 102 stores the motion vector predictor $MVP_{FX\_2}$ into the MV buffer 114, and initiates a MVP computation process of a next block. The DRAM latency of reading the reference data D_REF for computation of motion vector difference $MVD_{FX\_1}$ can be fully/partially hidden in a period during which computation of motion vector predictor $MVP_{FX\_2}$ is performed at MVP derivation circuit 102. Since computation of the next motion vector predictor $MVP_{FX\_2}$ does not need to wait for an end of computation of the current motion vector difference $MVD_{FX\_1}$, the decoder performance can be greatly improved.

After the motion vector difference $MVD_{FX\_1}$ is determined by the DMVR circuit 104, the combining circuit 108 is arranged to read the motion vector predictor $MVP_{FX\_1}$ from the MV buffer 114, receive the motion vector difference $MVD_{FX\_1}$ output from the DMVR circuit 104, and combine the motion vector predictor $MVP_{FX\_1}$ and the motion vector difference $MVD_{FX\_1}$ to generate a refined motion vector $MV_{FX\_1}$ ($MV_{FX\_1}=MVP_{FX\_1}+MVD_{FX\_1}$) for the current block, wherein the refined motion vector $MV_{FX\_1}$ is in the first representation format such as the fixed-point format. To reduce the memory usage, the format conversion circuit 112 is arranged to perform format conversion upon the refined motion vector $MV_{FX\_1}$. Specifically, the format conversion circuit 112 is arranged to receive the refined motion vector $MV_{FX\_1}$ output from the combining circuit 108, convert the refined motion vector $MV_{FX\_}1$ in the first representation format into a refined motion vector $MV_{FP\_}1$ in a second representation format such as a floating-point format, and store the refined motion vector $MV_{FP\_}1$ into the DRAM 116 for later use. For example, the refined motion vector $MV_{FX\_}1$ in the first representation format has a bit length of 18, and the refined motion vector $MV_{FP\_}1$ in the second representation format has a bit length of 10. It should be noted that there may be a conversion loss resulting from converting an 18-bit fixed-point representation to a 10-bit floating-point representation consisting of, for example, a 4-bit exponent and a 6-bit mantissa.

When the motion vector of the current block is to be selected as a candidate of a motion vector predictor for a later decoded block (e.g. a block in a picture that is in the future with respect to the current picture in the display order), the format conversion circuit 110 is arranged to read the refined motion vector $MV_{FP\_}1$ from the DRAM 116, and perform format conversion upon the refined motion vector $MV_{FP\_}1$. Specifically, the format conversion circuit 110 is arranged to convert the refined motion vector $MV_{FP\_}1$ in the second representation format (e.g. floating-point format) into a refined motion vector $MV_{FX\_}1'$ in the first representation format (e.g. fixed-point format), and provide the refined motion vector $MV_{FX\_}1'$ to the MVP derivation circuit 102. Since there may be a conversion loss resulting from converting a fixed-point representation to a floating-point representation, the refined motion vector $MV_{FX\_}1'$ is not necessarily the same as the refined motion vector $MV_{FX\_}1$.

Figure 2:
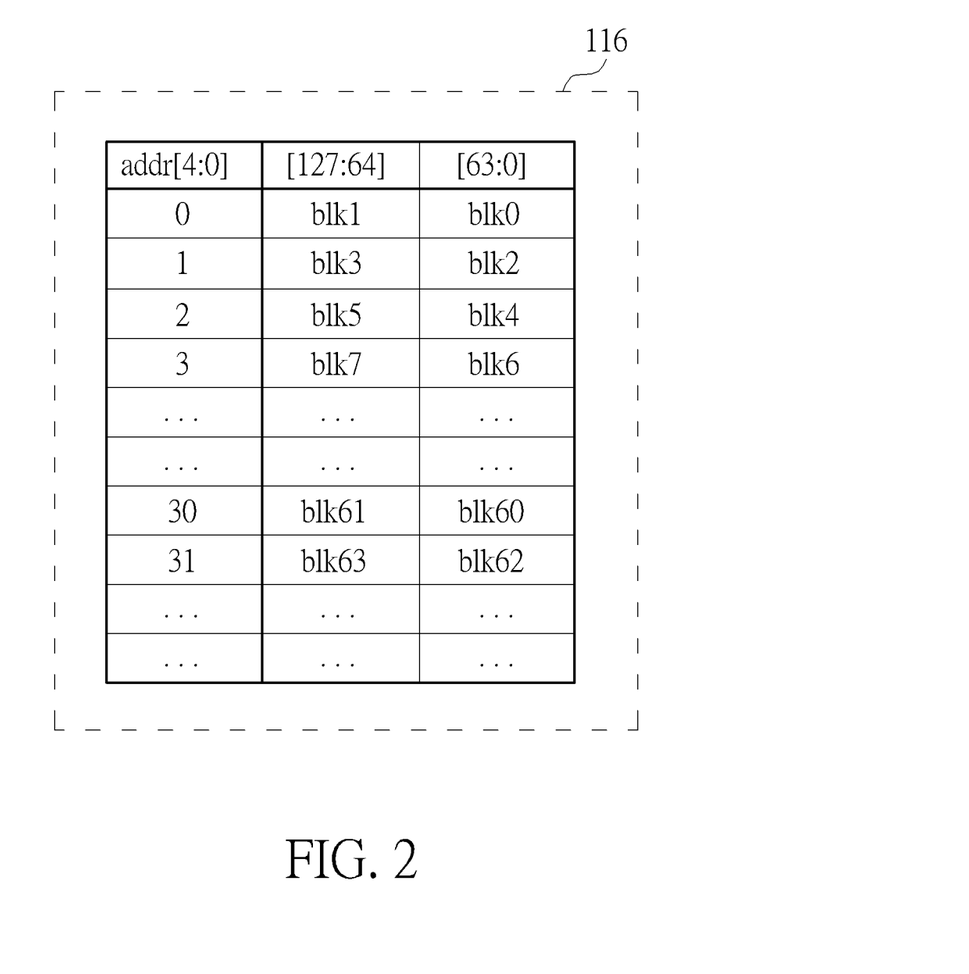
FIG. 2 is a diagram illustrating a dynamic random access memory (DRAM) footprint according to an embodiment of the present invention.

The format conversion circuit 112 converts a refined motion vector of each block in the first representation format (e.g. fixed-point format) into a refined motion vector in the second representation format (e.g. floating-point format), and stores the refined motion vector in the second representation format (e.g. floating-point format) into the DRAM 116. FIG. 2 is a diagram illustrating a DRAM footprint according to an embodiment of the present invention. The DRAM footprint defines a storage space in which a refined motion vector of a block should be stored.

Figure 3:
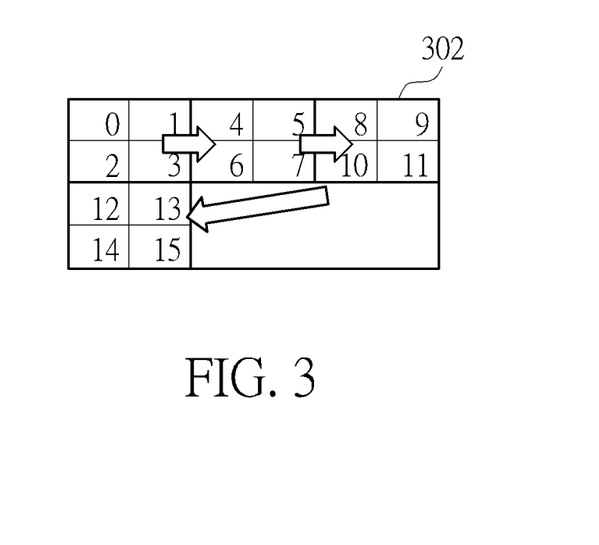
FIG. 3 is a diagram illustrating an example of using the DRAM footprint shown in FIG. 2 for storing refined motion vectors of blocks in large coding units (LCUs) each having an LCU size of 32×32.

FIG. 3 is a diagram illustrating an example of using the DRAM footprint shown in FIG. 2 for storing refined motion vectors of blocks in large coding units (LCUs) each having an LCU size of 32×32. Taking the LCU 302 for example, refined motion vectors of blocks indexed by 0 and 1 are stored at an address addr[4:0]=0 according to the DRAM footprint shown in FIG. 2, and refined motion vectors of blocks indexed by 2 and 3 are stored at an address addr[4:0]=1 according to the DRAM footprint shown in FIG. 2.

Figure 4:
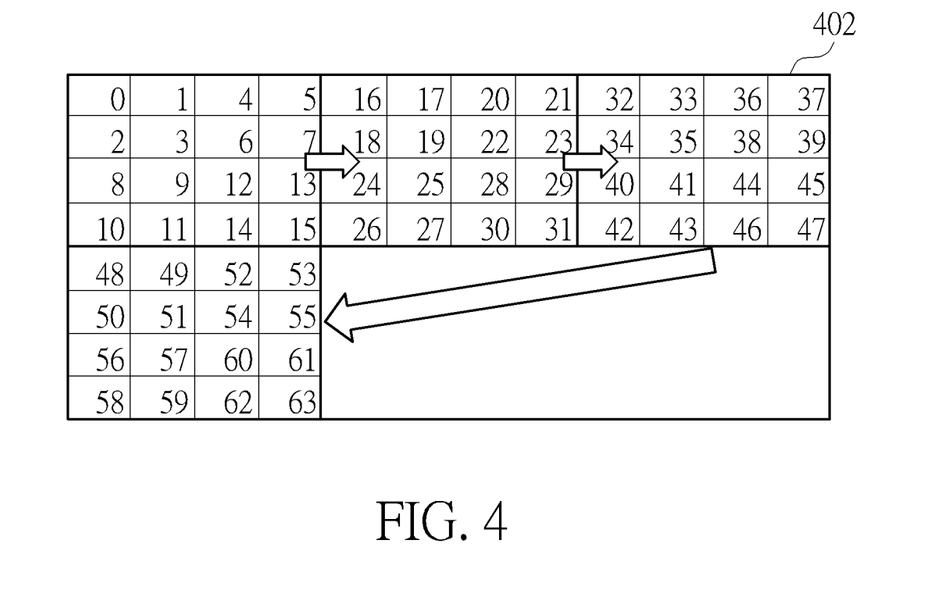
FIG. 4 is a diagram illustrating an example of using the DRAM footprint shown in FIG. 2 for storing refined motion vectors of blocks in LCUs each having an LCU size of 64×64.

FIG. 4 is a diagram illustrating an example of using the DRAM footprint shown in FIG. 2 for storing refined motion vectors of blocks in LCUs each having an LCU size of 64×64. Taking the LCU 402 for example, refined motion vectors of blocks indexed by 0 and 1 are stored at an address addr[4:0]=0 according to the DRAM footprint shown in FIG. 2, refined motion vectors of blocks indexed by 2 and 3 are stored at an address addr[4:0]=1 according to the DRAM footprint shown in FIG. 2, refined motion vectors of blocks indexed by 4 and 5 are stored at an address addr[4:0]=2 according to the DRAM footprint shown in FIG. 2, refined motion vectors of blocks indexed by 6 and 7 are stored at an address addr[4:0]=3 according to the DRAM footprint shown in FIG. 2, and so on.

Figure 5:
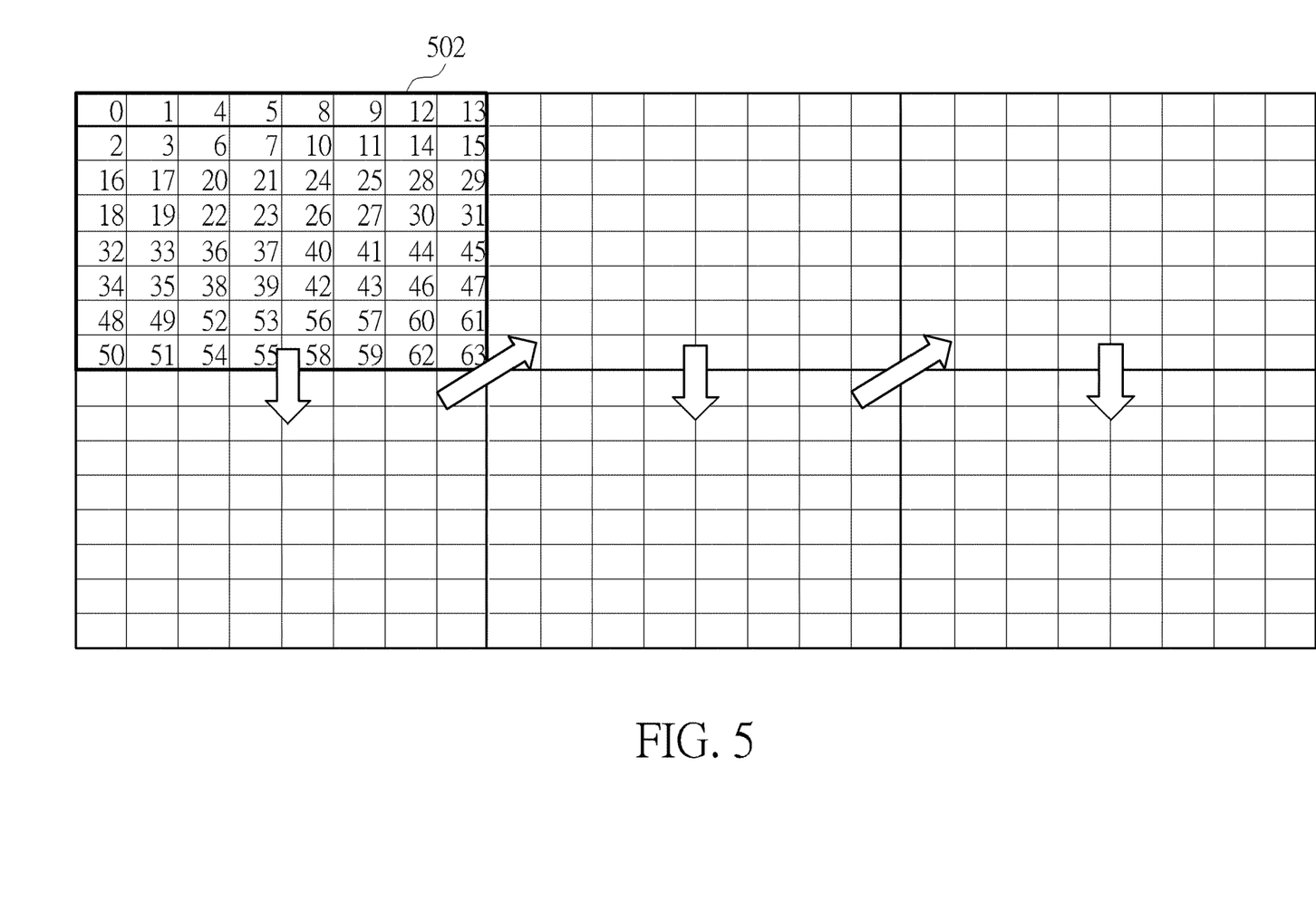
FIG. 5 is a diagram illustrating an example of using the DRAM footprint shown in FIG. 2 for storing refined motion vectors of blocks in LCUs each having an LCU size of 128×128.

FIG. 5 is a diagram illustrating an example of using the DRAM footprint shown in FIG. 2 for storing refined motion vectors of blocks in LCUs each having an LCU size of 128×128. Taking the LCU 502 for example, refined motion vectors of blocks indexed by 0-63 are stored at addresses addr[4:0]=0-addr[4:0]=31 according to the DRAM footprint shown in FIG. 2.

Figure 6:
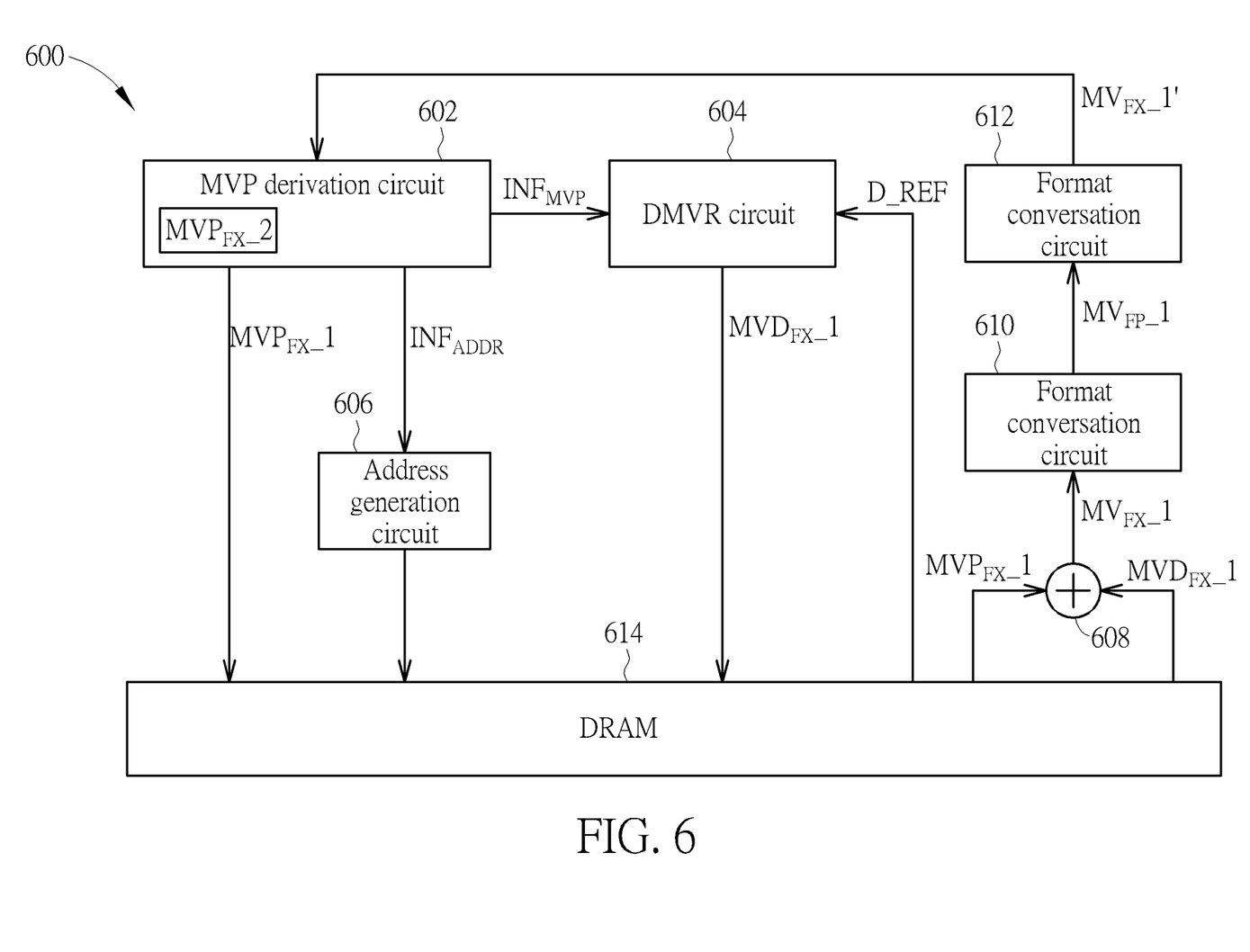
FIG. 6 is a diagram illustrating a second motion vector refinement apparatus according to an embodiment of the present invention.

FIG. 6 is a diagram illustrating a second motion vector refinement apparatus according to an embodiment of the present invention. The motion vector refinement apparatus 600 may be a part of a video decoder, and the video decoder is used to deal with decoding of an input bitstream that may be in compliance with a VVC standard (also known as H.266 standard). However, this is for illustrative purposes only, and is not meant to be a limitation of the present invention. In practice, any video decoder using the architecture proposed by the present invention falls within the scope of the present invention. The motion vector refinement apparatus 600 includes an MVP derivation circuit 602, a DMVR circuit 604, an address generation circuit 606, a combining circuit 608, a plurality of format conversion circuits 610, 612, and a DRAM 614 (which may be an off-chip storage device).

The MVP derivation circuit 602 is arranged to derive a motion vector predictor $MVP_{FX\_}1$ for a current block in a current picture, and stores the motion vector predictor $MVP_{FX\_}1$ into the DRAM 614. In this embodiment, the motion vector predictor $MVP_{FX\_}1$ is in a first representation format such as a fixed-point format. After the motion vector predictor $MVP_{FX\_}1$ is derived from motion vectors of neighbors of the current block under a merge mode, the MVP derivation circuit 602 is further arranged to provide side information $INF_{MVP}$ to the DMVR circuit 604, and provide side information $INF_{ADDR}$ to the address generation circuit 606. In response to the side information $INF_{ADDR}$, the address generation circuit 606 determines read addresses at which reference data D_REF (e.g. reference pixels in the forward reference picture and the backward reference picture) needed by computation of the motion vector difference $MVD_{FX\_}1$ are stored. In other words, the side information $INF_{ADDR}$ is sent to the address generation circuit 606 to request the reference data D_REF that are stored in the DRAM 614.

The DMVR circuit 604 is arranged to perform a DMVR operation to derive a motion vector difference $MVD_{FX\_}1$ for the motion vector predictor $MVP_{FX\_}1$ after receiving the side information $INF_{MVP}$ from the MVP derivation circuit 602, and store the motion vector difference $MVD_{FX\_}1$ into the DRAM 614. For example, the DMVR circuit 604 reads the reference data D_REF from the DRAM 614, calculates 25 SAD values for 25 positions within a search window centered at a position of the current block, finds a minimum SAD value among the 25 SAD values, and determines the motion vector difference $MVD_{FX\_}1$ according to a position with the minimum SAD value. In this embodiment, the motion vector difference $MVD_{FX\_}1$ is also in the first representation format such as the fixed-point format.

In this embodiment, the motion vector predictor $MVP_{FX\_}1$ and the motion vector difference $MVD_{FX\_}1$ determined for the same block are stored into the DRAM 614 individually. Since the motion vector predictor $MVP_{FX\_}1$ obtained by the MVP derivation circuit 602 is stored into the DRAM 614, the combining circuit 608 is arranged to obtain the motion vector predictor $MVP_{FX\_}1$ from the DRAM 614 rather than the MVP derivation circuit 602. With the help of the DRAM 614 that buffer an MVP output of the MVP derivation circuit 602, the MVP derivation circuit 602 is allowed to start a new task before the DMVR circuit 604 finishes deriving the motion vector difference $MVD_{FX\_}1$ for the motion vector predictor $MVP_{FX\_}1$ of the current block. In some embodiments, the new task includes at least one of deriving a motion vector predictor $MVP_{FX}\_2$ for a next block, reading a data from a storage device (e.g., DRAM 116 or SRAM which is not shown herein) for a later computation, writing a data to the storage device for a later computation, or any other tasks independent from deriving the motion vector difference in order to use free computation resource efficiently. In the embodiment that the new task performs deriving the motion vector predictor $MVP_{FX}\_2$ for the next block, after determining the motion vector predictor $MVP_{FX}\_2$ for the next block, the MVP derivation circuit 602 stores the motion vector predictor $MVP_{FX}\_2$ into the DRAM 614, and initiates a MVP computation process of a next block. Hence, the DRAM latency of reading the reference data D_REF for computation of motion vector difference $MVD_{FX}\_1$ can be fully/partially hidden in a period during which computation of motion vector predictor $MVP_{FX}\_2$ is performed at MVP derivation circuit 602. Since computation of motion vector predictor $MVP_{FX}\_2$ does not need to wait for an end of computation of motion vector difference $MVD_{FX}\_1$, the decoder performance can be greatly improved.

When the motion vector of the current block is to be selected as a candidate of a motion vector predictor for a later decoded block (e.g. a block in a picture that is in the future with respect to the current picture in the display order), the combining circuit 608 is arranged to read both of the motion vector predictor $MVP_{FX}\_1$ and the motion vector difference $MVD_{FX}\_1$ from the DRAM 614, and combine the motion vector predictor $MVP_{FX}\_1$ and the motion vector difference $MVD_{FX}\_1$ to generate a refined motion vector $MV_{FX}\_1$ ($MV_{FX}\_1 = MVP_{FX}\_1 + MVD_{FX}\_1$) for the current block, wherein the refined motion vector $MV_{FX}\_1$ is in the first representation format such as the fixed-point format.

Regarding the embodiment shown in FIG. 1, there may be a conversion loss resulting from converting a fixed-point representation to a floating-point representation. Regarding the embodiment shown in FIG. 6, the conversion loss is considered to provide the same refined motion vector $MV_{FX}\_1'$ for motion prediction at the MVP derivation circuit 602. Specifically, the conversion loss is introduced by passing the refined motion vector $MV_{FX}\_1$ through the format conversion circuit 610. The format conversion circuit 610 is arranged to perform format conversion upon the refined motion vector $MV_{FX}\_1$ output from the combining circuit 608. Specifically, the format conversion circuit 610 is arranged to receive the refined motion vector $MV_{FX}\_1$ output from the combining circuit 608, and convert the refined motion vector $MV_{FX}\_1$ in the first representation format into a refined motion vector $MV_{FP}\_1$ in a second representation format such as a floating-point format. For example, the refined motion vector $MV_{FX}\_1$ in the first representation format has a bit length of 18, and the refined motion vector $MV_{FP}\_1$ in the second representation format has a bit length of 10. Next, the format conversion circuit 612 is arranged to perform format conversion upon the refined motion vector $MV_{FP}\_1$ output from the format conversion circuit 610. Specifically, the format conversion circuit 612 is arranged to receive the refined motion vector $MV_{FP}\_1$ output from the format conversion circuit 610, convert the refined motion vector $MV_{FP}\_1$ in the second representation format (e.g. floating-point format) into a refined motion vector $MV_{FX}\_1'$ in the first representation format (e.g. fixed-point format), and provide the refined motion vector $MV_{FX}\_1'$ to the MVP derivation circuit 602. Like the motion vector refinement apparatus 100 shown in FIG. 1, the motion vector refinement apparatus 600 generates the refined motion vector $MV_{FX}\_1'$ that is not necessarily the same as the refined motion vector $MV_{FX}\_1$ due to a conversion loss resulting from converting a fixed-point representation to a floating-point representation.

Figure 7:
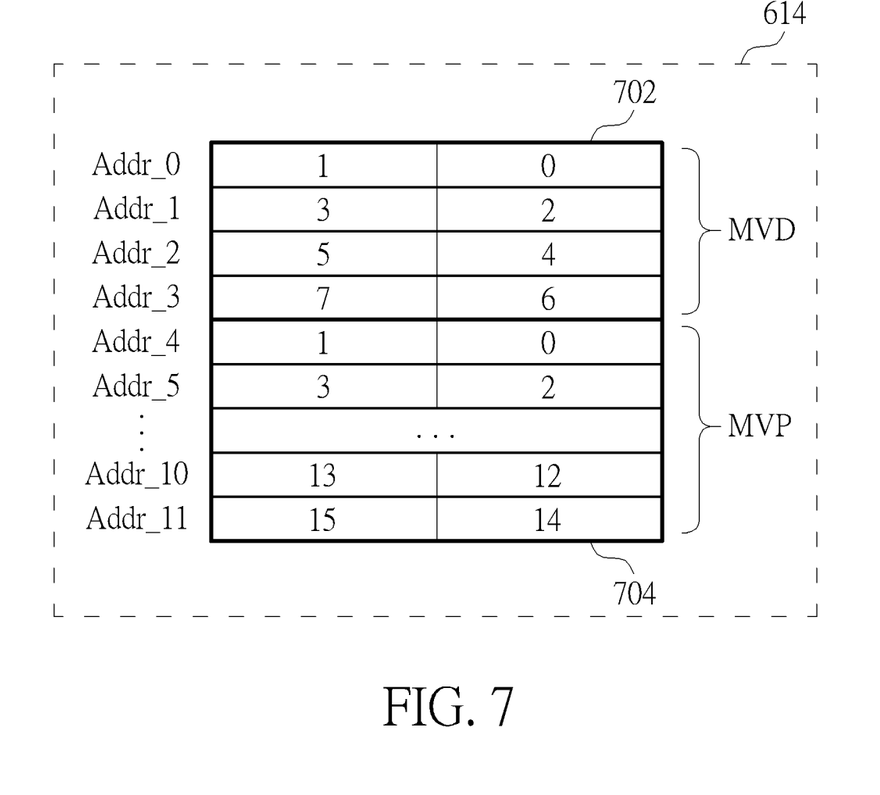
FIG. 7 is a diagram illustrating another DRAM footprint according to an embodiment of the present invention.
Figure 8:
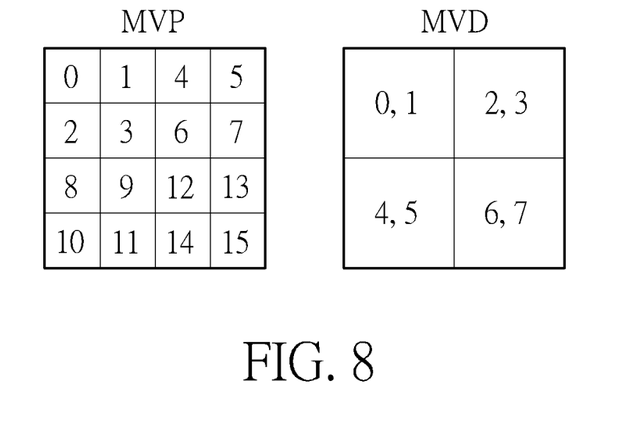
FIG. 8 is a diagram illustrating an example of using the DRAM footprint shown in FIG. 7 for storing motion vector predictors and motion vector differences.

Regarding each block to be decoded, the MVP derivation circuit 602 determines a motion vector predictor and stores the motion vector predictor into the DRAM 614, and the DMVR circuit 604 determines a motion vector difference and stores the motion vector difference into the DRAM 614. Since the motion vector predictor and the motion vector difference of the same block may be read from the DRAM 614 for determining a refined motion vector, a DRAM footprint may be properly designed to ensure that the motion vector predictor and the motion vector difference of the same block can be retrieved by a single bust transfer under a bust-mode of the DRAM 614. Please refer to FIG. 7 in conjunction with FIG. 8. FIG. 7 is a diagram illustrating another DRAM footprint according to an embodiment of the present invention. FIG. 8 is a diagram illustrating an example of using the DRAM footprint shown in FIG. 7 for storing motion vector predictors and motion vector differences. The DRAM footprint defines a storage area 702 addressed by contiguous addresses Addr_0-Addr_3 and an adjacent storage area 704 addressed by contiguous addresses Addr_4-Addr_11. The storage area 702 is used to store motion vector differences determined for blocks as shown in FIG. 8. The storage area 704 is used to store motion vector predictors determined for blocks as shown in FIG. 8. Hence, an address of a motion vector predictor of a block is constrained to be close to an address of a motion vector difference of the same block. For example, the MVP derivation circuit 602 is arranged to store an MVP of a block at a first address (e.g. Addr_4) of the DRAM 614, the DMVR circuit 604 is arranged to store an MVD of the same block at a second address (e.g. Addr_0) of the DRAM 614, and the address generation circuit 606 is arranged to generate a starting read address of a burst mode of the DRAM 614, wherein the burst mode of the DRAM 614 is arranged to read N (N>1) consecutive addresses, and the first address and the second address are a part of the N consecutive addresses. In this way, MVPs and MVDs of multiple blocks may be sequentially read from the DRAM 614 in a single burst transfer, and the combining circuit 608 can generate refined MVs of multiple blocks sequentially. The decoder performance can be further improved with the use of the proposed DRAM footprint.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motion vector refinement apparatus comprising:
a first storage device;
a motion vector predictor (MVP) derivation circuit, arranged to derive a first MVP for a current block, store the first MVP into the first storage device, and perform a new task;
a decoder side motion vector refinement (DMVR) circuit, arranged to perform a DMVR operation to derive a first motion vector difference (MVD) for the first MVP;
a second storage device;
a combining circuit, arranged to read the first MVP from the first storage device, and combine the first MVP and the first MVD to generate a first refined MV for the current block, wherein the first refined MV is in a first representation format; and a first format conversion circuit, arranged to receive the first refined MV output from the combining circuit, convert the first refined MV in the first representation format into a second refined MV in a second representation format, and store the second refined MV into the second storage device, wherein the second representation format is different from the first representation format;

wherein the MVP derivation circuit is free to start performing the new task before the DMVR circuit finishes deriving the first MVD for the first MVP.

2. The motion vector refinement apparatus of claim 1, wherein the new task includes at least one of deriving a second MVP for a next block, reading a first data for a first computation, and writing a second data for a second computation.

3. The motion vector refinement apparatus of claim 1, wherein a bit length of the second refined MV is shorter than a bit length of the first refined MV.

4. The motion vector refinement apparatus of claim 1, wherein the first representation format is a fixed-point format, and the second representation format is a floating-point format.

5. The motion vector refinement apparatus of claim 1, further comprising:
a second format conversion circuit, arranged to read the second refined MV from the second storage device, convert the second refined MV in the second representation format into a third refined MV in the first representation format, and provide the third refined MV to the MVP derivation circuit.

6. A motion vector refinement apparatus comprising:
a first storage device;
a motion vector predictor (MVP) derivation circuit, arranged to derive a first MVP for a current block, store the first MVP into the first storage device, and perform a new task;
a decoder side motion vector refinement (DMVR) circuit, arranged to perform a DMVR operation to derive a first motion vector difference (MVD) for the first MVP, and store the first MVD into the first storage device, wherein the MVP derivation circuit is free to start performing the new task before the DMVR circuit finishes deriving the first MVD for the first MVP;
a combining circuit, arranged to read the first MVP and the first MVD from the first storage device, and combine the first MVP and the first MVD to generate a first refined MV for the current block, wherein the first refined MV is in a first representation format;
a first format conversion circuit, arranged to receive the first refined MV output from the combining circuit, and convert the first refined MV in the first representation format into a second refined MV in a second representation format, wherein the second representation format is different from the first representation format; and
a second format conversion circuit, arranged to receive the second refined MV output from the first format conversion circuit, convert the second refined MV in the second representation format into a third refined MV in the first representation format, and provide the third refined MV to the MVP derivation circuit.

7. The motion vector refinement apparatus of claim 6, wherein a bit length of the second refined MV is shorter than a bit length of the first refined MV, and a bit length of the third refined MV is equal to the bit length of the first refined MV.

8. The motion vector refinement apparatus of claim 6, wherein the first representation format is a fixed-point format, and the second representation format is a floating-point format.

9. A motion vector refinement apparatus comprising:
a first storage device;
a motion vector predictor (MVP) derivation circuit, arranged to derive a first MVP for a current block, store the first MVP into the first storage device, and perform a new task;
a decoder side motion vector refinement (DMVR) circuit, arranged to perform a DMVR operation to derive a first motion vector difference (MVD) for the first MVP, and store the first MVD into the first storage device, wherein the MVP derivation circuit is free to start performing the new task before the DMVR circuit finishes deriving the first MVD for the first MVP;
wherein the MVP derivation circuit is arranged to store the first MVP at a first address of the first storage device, the DMVR circuit is arranged to store the first MVD at a second address of the first storage device, and the motion vector refinement apparatus further comprises:
an address generation circuit, arranged to generate a starting read address of a burst mode of the first storage device, wherein the burst mode of the first storage device is arranged to read a plurality of consecutive addresses, and the first address and the second address are a part of the plurality of consecutive addresses.

10. A motion vector refinement method comprising:
deriving a first motion vector predictor (MVP) for a current block;
storing the first MVP into a first storage device;
performing a decoder side motion vector refinement (DMVR) operation to derive a first motion vector difference (MVD) for the first MVP;
before deriving the first MVD for the first MVP is finished, starting to perform a new task;
reading the first MVP from the first storage device;
combining the first MVP and the first MVD to generate a first refined MV for the current block, wherein the first refined MV is in a first representation format;
converting the first refined MV in the first representation format into a second refined MV in a second representation format; and
storing the second refined MV into a second storage device, wherein the second representation format is different from the first representation format.

11. The motion vector refinement method of claim 10, wherein the new task includes at least one of deriving a second MVP for a next block, reading a first data for a first computation, and writing a second data for a second computation.

12. The motion vector refinement method of claim 10, wherein a bit length of the second refined MV is shorter than a bit length of the first refined MV.

13. The motion vector refinement method of claim 10, wherein the first representation format is a fixed-point format, and the second representation format is a floating-point format.

14. The motion vector refinement method of claim 10, further comprising:
reading the second refined MV from the second storage device;

converting the second refined MV in the second representation format into a third refined MV in the first representation format; and providing the third refined MV for MVP derivation.

15. A motion vector refinement method comprising:
deriving a first motion vector predictor (MVP) for a current block;
storing the first MVP into a first storage device;
performing a decoder side motion vector refinement (DMVR) operation to derive a first motion vector difference (MVD) for the first MVP;
storing the first MVD into the first storage device;
before deriving the first MVD for the first MVP is finished, starting to perform a new task;
reading the first MVP and the first MVD from the first storage device;
combining the first MVP and the first MVD to generate a first refined MV for the current block, wherein the first refined MV is in a first representation format;
converting the first refined MV in the first representation format into a second refined MV in a second representation format, wherein the second representation format is different from the first representation format;
converting the second refined MV in the second representation format into a third refined MV in the first representation format; and
providing the third refined MV for MVP derivation.

16. The motion vector refinement method of claim 15, wherein a bit length of the second refined MV is shorter than a bit length of the first refined MV, and a bit length of the third refined MV is equal to the bit length of the first refined MV.

17. The motion vector refinement method of claim 15, wherein the first representation format is a fixed-point format, and the second representation format is a floating-point format.

18. A motion vector refinement method comprising:
deriving a first motion vector predictor (MVP) for a current block;
storing the first MVP into a first storage device;
performing a decoder side motion vector refinement (DMVR) operation to derive a first motion vector difference (MVD) for the first MVP;
storing the first MVD into the first storage device; and
before deriving the first MVD for the first MVP is finished, starting to perform a new task;
wherein storing the first MVP into the first storage device comprises:
storing the first MVP at a first address of the first storage device;
storing the first MVD into the first storage device comprises:
storing the first MVD at a second address of the first storage device; and
the motion vector refinement method further comprises:
generating a starting read address of a burst mode of the first storage device, wherein in response to the starting read address, the burst mode of the first storage device reads a plurality of consecutive addresses, where the first address and the second address are a part of the plurality of consecutive addresses.

* * * * *